United States Patent Office 3,563,823
Patented Feb. 16, 1971

3,563,823
METHOD FOR INTERNALLY SEALING GAS MAIN JOINTS
Gene G. Yie, Chicago, Ill., assignor, by mesne assignments, to American Gas Association, Inc., New York, N.Y., a membership corporation of New York
No Drawing. Filed June 9, 1967, Ser. No. 644,833
Int. Cl. B32b 35/00; F16l 55/18
U.S. Cl. 156—94                                16 Claims

ABSTRACT OF THE DISCLOSURE

A process for sealing the leaking fibrous packings of gas main joints which involves first saturating the fibrous packing, permitting the packing to swell by action of the sealing material, and then curing the sealing material to provide a solid, tough, non-volatile, and permanent seal for the joint. The process is carried out by a sealing material comprising an epoxy resin of the type of polyglycol di- or triepoxide, and an aliphatic or aromatic amine curing agent. An additive for swelling the fibrous packing is preferably used. The sealing material is applied to the packing by pouring down an inclined gas main to a low point and permitting the sealing substance to saturate the packing; the sealant may also be applied by spraying or pressure application.

BACKGROUND OF THE INVENTION

Field of the invention and description of the prior art

This invention relates to an improved method for sealing the leaking joints of gas main joints packed with fibrous packings, such as jute.

In the United States, there are thousands of miles of gas main made of cast iron pipe having packed bell-and-spigot joints. These mains are generally in good condition and are expected to have a long useful life. However, there is relatively high incidence of gas leakage from the packed joints. One common way to repair these joints is to excavate around each joint and then apply a mechanical clamp around the exterior of the joint. This procedure, however, is expensive. This external sealing method is also disadvantageous because the joints are quite close together, such as twelve feet, so that many excavations are required to repair each of the joints of a defective main and a public nuisance results.

Because of the disadvantages of external pipe sealing methods, gas main joints may also be sealed by various internal sealing methods. Internal sealing methods are generally disadvantageous because the main must be taken out of service while the repairs are made. In addition to creating a customer inconvenience, the actual cost of shutting down and later restoring service to a gas main is very expensive. Thus, it is desirable to have a method for sealing leaking gas main joints which is accomplished internally, but yet the joints may be sealed both while in service and while temporarily out of service.

One internal sealing method which permits sealing to occur during repairs requires pouring a sealing liquid into a leaking gas main. The liquid is introduced to the main at a high point so that the sealing substance moves down the inclined main to the leaking joints at the lower portions of the main. The liquid climbs and fills the pores of the fibrous joint packings, commonly jute, by capillary action. The excess sealing liquid flows into drip pots provided at lower points in the main where the sealing liquid may be recovered and then reused. This one method for in-service sealing of gas main joints is limited to the sealing of about eight inch or smaller mains because the liquid that has been used, commonly a mixture of diethylene glycol and cresol or phenol, will not climb any higher in the packing by capillary action. For internal sealing involving larger diameter pipes, such as eight inches or more, the sealing liquid may be sprayed onto the packing. In this method, a hose is inserted in the main, pulled through, stopped at each joint, and the liquid sealant is sprayed on the packing.

In the in-service method, whether the sealant is introduced to the packing by spraying or by capillary action, the seal is formed by a low viscosity liquid. As a result, the seal can withstand only very low gas pressures, such as about 2 p.s.i.g. or less. Also, this sealant evaporates from the packing and can become leached out of the packing by water. Therefore, in order to maintain the seal, the joints must be periodically resealed.

In U.S. patent application Ser. No. 414,870, filed Nov. 30, 1964, allowed on Nov. 12, 1969, there is shown and described a process for repairing gas main joints which is designed to avoid the disadvantages of the prior art methods. Although the disclosed process is an improvement over the known prior art, it has not been found to be completely satisfactory for all applications. In certain applications, for example, the sealing substance does not properly saturate the packing and even when saturated, does not always provide a highly reliable seal for all the leaking joints.

SUMMARY OF THE INVENTION

It is therefore an important object of this invention to provide an improved process for internally sealing the leaking fibrous packings of a gas main joint wherein the fibrous packing is repaired either in service or out of service and wherein the disadvantages and failures of the known prior art sealing methods are substantially avoided.

It is a further important object of this invention to provide an improved process for internally sealing the leaking fibrous packing of gas main joints wherein after saturation of the packing, but before curing the sealing substance to provide a solid and permanent seal for the joint, the sealing substance is permitted to swell the packing in the bell-and-spigot joint so as to provide a highly reliable and effective seal.

It is another important object of this invention to provide an improved method for sealing gas main joints wherein the sealing substance may be applied to the jute packings by capillary action, by spraying, or by pressure filling.

It is a further important object of this invention to provide an improved process for repairing the leaking fibrous packings of gas main joints wherein the seals are solid, tough, non-volatile, and permanent, effective against relatively high gas main pressures, and the joints are chemicaly inert to the gases flowing through the main.

Further purposes and objects of this invention will appear as the specification proceeds.

In one aspect of the invention, a process for internally sealing a leaking fibrous packing of a gas main joint comprises first saturating the fibrous packing with a liquid sealing substance capable of saturating and swelling the fibrous packing and being curable to a solid state, causing the saturated packing to swell by action of the sealing substance, and then curing the sealing substance to provide a solid, tough, non-volatile, and permanent seal for the joint.

DESCRIPTION OF THE PREFERRED EMBODIMENT

The first step of my process for sealing the leaking fibrous packings of gas main joints is the introduction of a particular liquid sealing material to the leaking gas main and to the leaking packings. The sealing material is added to the main in a variety of ways, including by pumping the liquid sealant into the main, by pouring the sealing liquid into a high point in an inclined main, by spraying the sealing liquid directly onto the joint, or by pressure application of the liquid directly upon the fibrous packed joints. In each method used, the liquid sealant is added to the main through a service T or similar connection. The pouring technique is not as effective as the spraying and pressure applying techniques in the sealing of larger diameter mains, such as those over eight inches. Since in the pouring techniques the fibrous packings become saturated by the liquid sealant climbing the packing or jute by capillary action, the spraying and pressure applying techniques provide more positive saturation of the large diameter mains, particularly at the upper ends.

When the technique of pouring the liquid sealing material is used, the liquid sealant flows from a high point in the main, where the liquid sealant is poured, to joints at the lower portions of the inclined main. At a low point in the main, excess sealing material is collected in a drip pot and advantageously it is recirculated.

Most gas main joints are packed with fibrous materials which are readily permeated by liquid sealants. Jute constitutes a major portion of the existing fibrous gas main packings. The standard commercial jute packings are commonly reprocessed jute made from cotton bales. Generally, only jute and cotton fibers are used as packings for gas main joints. The fibrous nature of these packings enable the liquid sealing substances to climb the packing by capillary action, to saturate the packings and effect the desired seal.

The total amount of sealant necessary for sealing a section of gas main is determined by the size, length, and the condition of the jute packings in the particular gas main. The schedule of pouring the sealing liquid into the main is governed by the gradient of the section of main to be treated. For a section of a substantially level main, the sealant is desirably added in about 2 to 4 portions. For a section of an inclined main of a relatively sharp gradient, the sealing liquid is preferably added in about 8 to 10 portions. Thus, the sealant is added to the main so as to assure constant contact between the sealant and jute packing. The recirculation is continued until the viscosity of the overflow material collected at the drip pot exceeds 1,000 centiposes since liquid of such viscosity is no longer capable of penetrating or climbing the jute packing.

After the liquid sealant has been provided sufficient time to saturate the packings, it is important that the liquid sealing substance swells the saturated fibrous packing in the joint so as to provide a highly effective and reliable seal. The swelling of the fibrous packing occurs only after the packing has become saturated with the liquid sealing substance. Preferably, a component of sealing substance acts to increase the swelling of the fibrous packings.

After the packing becomes saturated and swells to the desired extent, the sealing substance saturating the packing is cured to provide a tough, solid, non-volatile, and permanent seal for the fibrous packed joint. The curing rate of the liquid sealant is determined by the method used to apply the sealant to the gas main. In spraying or pressure application, the sealant wets and penetrates the jute packing readily; therefore, a relatively fast curing rate, such as 2–3 days, is preferred. When the sealant is applied by flowing from the high point to the low point inside the gas main, adequate time should be allowed for the jute packing to become saturated with sealant; thus, a relatively slow curing rate is required. At locations where the packings are highly contaminated, a period of 1 to 2 weeks is often required for the sealant to reach the top of the jute packing. The curing rate is controlled by the specific formulation of the liquid sealant. The curing of the saturated fibrous packing can be accomplished in a variety of ways. Preferably, a curing agent is incorporated within the liquid sealing substance. As still another alternative, curing may be accomplished by the lapse of time as liquid monomers which saturate the packing joint polymerize. The most important aspect of the present invention is in using a particular liquid sealing substance. The sealant used must be capable of curing or being cured so as to provide a highly reliable seal. A sealant which properly wets or saturates the fibrous packing and then swells the fibrous packing is to be a free flowing liquid of less than about 500 cp. viscosity and is to have a surface tension of at least about 20 dynes/cm. in its uncured condition. Generally speaking, the lower the viscosity and the higher the surface tension of the substance, the better will the process effect the desired seal. The sealing material must also be non-reactive with the gas flowing in the main and must be compatible with contaminants in the packing, which may include aromatic and aliphatic hydrocarbons, oxidized gums, rust and dirt.

The ability of the liquid sealant to wet or saturate a packing is measured by the time required for a 5 gram sample of jute, compacted into a specially designed container, to sink in the sealing liquid. A suitable sealant for the process should not take more than about five minutes to sink to the bottom of the container. The container constructed is a perforated section of Teflon tubing having end caps. The container has an outside diameter of 1 and ½ inches, an inside diameter of 1 inch, a height of 3 inches, and has 72 equally spaced ¼ inch diameter holes. The container is filled with a weighted amount of packing (7 grams when new jute is used) and is placed on its side on the surface of a container of the liquid sealant. The time required for the jute filled container to sink below the surface of the sealant is the measure of the wetting ability of the liquid sealing substance.

After the sealant has properly saturated and swelled the fibrous packing, curing is accomplished to provide a tough seal which will withstand gas pressures up to about 25 p.s.i.g. Packings sealed in accordance with our invention do not exhibit any tendency to evaporate or shrink after long periods of time.

If the packings are to be sealed while the main remains in service by relying on capillary action to saturate the packing, the sealant is preferably poured in the winter months and is cured during the warmer months of the year. During the winter, the main temperature averages about 50° F. or below so the reaction between the reactive components is rather slow. Thus, the liquid sealing substance is allowed adequate time to completely saturate and swell the packing. During the warmer months of the spring and summer when the temperature in the main increases, the components react to form a solid tough gasket for sealing the packing joints.

In one preferred form of my invention, the liquid sealing substance comprises two reactive components, namely a liquid epoxy resin and a curing agent. The epoxy resin which has been found to be particularly satisfactory and preferred in my process is a liquid epoxy resin of the type of polyglycol diepoxide or polyglycol triepoxide or a mixture of these two epoxides. The epoxy resin has an epoxide equivalent weight of 140 to 205, a viscosity of 30 to 150 centipoises, and a specific gravity of 1.05 to 1.25, and contains no diluent. About ½ to 1 part by weight of the curing agent and about 1 part by weight of the epoxy resin are used.

A liquid epoxy resin which is found to be particularly satisfactory in my process is manufactured by Dow Chemical Company under the trade marks D.E.R. 732 and D.E.R. 736. These epoxy resins are polyglycol diepoxides and have a theoretical structure as follows:

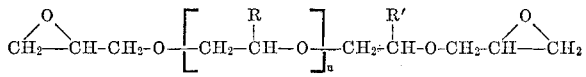

The D.E.R. 736 resin has a lower value of $n$, so that it has a shorter chain length than the D.E.R. 732 resin.

The curing agent used in admixture with the described resin is preferably pyridine, picoline, piperidine, amylamine, hexylamine, heptylamine, octylamine, ethylene diamine, diethylene triamine, and triethylene tetramine. Preferably, this liquid sealing mixture contains about 1 to 3 parts by weight of the liquid epoxy resin and about 1 part by weight of the amine curing agent.

It is preferred that a third component be used in the sealant to improve the swelling ability of the sealing substance. This component also lowers the viscosity of the sealant as well as its cost. The swelling component is preferably a polyalcohol, including ethylene glycol, diethylene glycol, and dipropylene glycol, phenols including phenol and cresol. A swelling additive may also be selected among amides including formamide and dimethyl formamide. When a swelling additive is used in the liquid sealing mixture, about 4 parts by weight of the liquid epoxy resin, about ⅕ to 2 parts by weight of a suitable additive, and about 2 to 6 parts by weight of the amine curing agent are used.

In the method wherein the curing of the liquid sealant is accomplished by adding the curing agent at a later time, the described epoxy resin or a mixture of the liquid epoxy resin and one of the above described swelling additives may be applied to the joint. A sufficient period of time is permitted to elapse for the joint to become sufficiently saturated with the liquid sealant. After this occurs, the curing agent is applied to the saturated joints of the gas main such as by spraying. It is desirable to introduce the curing agent to the gas main along with the gas stream as a vapor. The particular amine that is selected as a curing agent should have a vapor pressure higher than about 50 mm. of mercury at 20° C. to provide the desired results.

In another embodiment of the invention wherein the liquid sealing mixture is cured by lapse of time, a monomer or a mixture of two different monomers is added to the main and is permitted to saturate and swell the leaking packing. Polymerization occurs over an extended period of time. When selecting the monomer, it is important that a relatively long period of time be permitted to elapse so that the monomer or monomer mixture may saturate the packing joint and swell the same before polymerization proceeds to any significant substantial extent. A blend of a styrene monomer and a divinyl benzene monomer is particularly satisfactory as the liquid sealant in this form of the invention. This monomer system wets and climbs through approximately 18 inches of jute packing in a relatively short period of time, copolymerizes into a suitable polymer with accompanied swelling of the fibrous packing, which may be as much as 20 to 40 times the original volume of the packing. This great expansion of volume during polymerization provides a highly reliable and permanent seal at the leaky joint. When a mixture of two monomers is used, about 100 parts by weight of the styrene monomer and less than about 10 parts by weight of the divinyl benzene monomer are used.

The following examples provide specific embodiments of my invention:

EXAMPLE I

As one example of my invention, a 900-ft. section of 6 inch cast-iron main located in a residential area of a city was treated with the described process, and the leaking joints were treated in order to provide a permanent seal. A high point in the main was selected for adding a liquid sealant and a low point having a drip pot was selected to collect the excess liquid. A liquid sealant with 3 parts by weight of a liquid epoxy resin of the type of polyglycol diepoxide (D.E.R. 736) together with 1 part by weight of pyridine was used. A total of 60 gallons of the liquid sealant was added to the main from a tapped riser at the selected high point of the main. The sealant was added slowly in several portions over a period of 5 days. The overflow material was collected at a drip pot and was recirculated again to the gas main. After a period of 4 weeks, the overflow material collected at the drip pot became thickened and the recirculation was then terminated. This particular section of main treated had 26 recorded leaks at joints prior to treatment. All the recorded leaks were quite substantial, having leakage readings in the percent (percent gas) range. The summation of combustion leak detector meter reading of the 26 leaks was 800 in percent—gas range. At the end of two months, only 2 small leaks of a total meter reading of 10 in range of lower explosive limit (LEL) remained. Since 100 LEL is equal to 5% gas in a combustion leak detector, a total reduction in leakage reading of better than 99.9% was thus accomplished. Field insepection performed about a year later indicated that leakage has not recurred.

EXAMPLE II

As another example of my invention, a 300-ft. section of 6 in. cast-iron gas main also located in a residential area of a city, was treated with the described process for the purpose of sealing leaking joints. The sealant used comprised 100 parts by weight of a liquid epoxy resin of the type of polyglycol diepoxide (D.E.R. 736) and 35 parts by weight of pyridine. A total of 50 gals. of the liquid sealant was added in five portions over a period of 4 days. A total of 33 gals. of sealant was recirculated. This section of main had 18 known leaking joints totalling 820 in percent—gas range as detected with a commercial combustion gas leak detector. At the end of 2 months after the treatment was started, only three small leaks totalling 30% gas in leakage reading remained. A leakage reading reduction of 96.3% was obtained.

EXAMPLE III

As a further example of my invention, a section of 350 ft., 6 in. cast-iron gas main located in a metropolitan area was treated with a liquid sealant. The treatment was similar to that of the first example. The sealant was used made up of 100 parts by weight of a liquid epoxy resin of the type of polyglycol diepoxide (D.E.R. 736), 50 parts by weight of pyridine, and 5 parts by weight of formamide. The three components were mixed immediately prior to field use. A total of 25 gals. of the liquid sealant was added over 2 days. At the end of one month from the treatment, 14 leaks out of 15 recorded leaks had disappeared. Only one small leak remained.

What I claim and desire to secure by Letters Patent is:

1. A process for internally sealing a leaking fibrous packing at a joint in a gas main, said process comprising the steps of saturating said fibrous packing with a liquid sealing substance capable of swelling said packing and of being cured to a substantially solid state, said liquid sealing substance being selected from the group consisting of a liquid epoxy resin of polyglycol diepoxide, polyglycol triepoxide, and a mixture of said epoxides, and a curing agent for said resin, swelling said fibrous packing at said joint with said liquid sealing substance to provide a highly effective and reliable seal, and curing said liquid substance saturating said swollen packing so that said cured sealing substance combines with said swollen packing to provide a solid, tough, non-volatile and permanent seal for said fibrous packed joint.

2. The process of claim 1 wherein said gas main is normally inclined and has a high point and a lower point, said liquid sealing substance is poured into said main at said high point so the substance moves downwardly to a joint at said lower point, said liquid sealing substance climbing said fibrous packing by capillary action to saturate said packing.

3. The process of claim 2 wherein about ¼ of a gallon of said liquid sealing substance is poured into said main per joint to be treated.

4. The process of claim 1 wherein said liquid sealing substance is sprayed on said fibrous packing at said joint to saturate said fibrous packed joint with said liquid sealing substance.

5. The process of claim 1 wherein said liquid sealing substance is forced by pressure on said fibrous packing to saturate said fibrous packed joint with said sealing substance.

6. The process of claim 2 wherein a drip pot is provided at said lower point in said main, said liquid sealing substance is collected in said drip pot, and said liquid sealing substance is recirculated through said main by pouring at said high point.

7. The process of claim 1 wherein said liquid sealing substance has a viscosity less than about 500 cps. and has a surface tension of at least about 29 dynes/cm. in the uncured condition.

8. The process of claim 1 wherein said curing agent is selected from the group consisting of pyridine, picoline, piperidine, amylamine, hexylamine, heptylamine, octylamine, ethylene diamine, diethylene triamine, and triethylene tetramine.

9. The process of claim 1 wherein 1 to 3 parts by weight of said liquid resin are used and 1 part by weight of said amine curing agent is used.

10. A process for internally sealing a leaking fibrous packing at a joint in a gas main, said process comprising the steps of saturating said fibrous packing with a liquid sealing substance capable of swelling said packing and of being cured to a substantially solid state, said liquid sealing substance comprising a material selected from the group consisting of polyglycol diepoxide, polyglycol triepoxide, and a mixture of said epoxides, a curing agent, and a component suitable for increasing the swelling of said fibrous packing after saturation of said packing with said liquid sealing substance, swelling said fibrous packing at said joint with said sealing substance to provide a highly effective and reliable seal, and curing said sealing substance saturating said swollen packing so that said cured sealing substance combines with said swollen packing to provide a solid, tough, non-volatile and permanent seal for said fibrous packed joint.

11. The process of claim 10 wherein said curing agent is selected from the group consisting of pyridine, picoline, piperidine, amylamine, hexylamine, heptylamine, octylamine, ethylene diamine, diethylene triamine and triethylene tetramine.

12. The process of claim 10 wherein said swelling component is selected from the group consisting of ethylene glycol, diethylene glycol, dipropylene glycol, phenol, cresol, formamide, and dimethyl formamide.

13. The process of claim 10 wherein about 4 parts by weight of said epoxy resin, about 2 to 6 parts by weight of said curing agent, and about 1/5 to 2 parts by weight of said component are used.

14. A process for internally sealing a leaking fibrous packing at a joint in a gas main, said process comprising the steps of saturating said fibrous packing with a liquid sealing substance capable of swelling said packing and of being cured to a substantially solid state, said liquid sealing substance comprising a material selected from the group consisting of styrene monomer, divinyl benzene monomer, and a mixture of said monomers, swelling said fibrous packing at said joint with said liquid sealing substance to provide a highly effective and reliable seal, and curing said sealing substance saturating said swollen packing to provide a solid, tough, non-volatile, and permanent seal for said fibrous packed joint, a sufficient period of time being permitted to elapse for said monomer to saturate and swell said packing before polymerization of said monomers is completed.

15. The process of claim 14 wherein about 100 parts by weight of styrene monomer and less than about 10 parts by weight of divinyl benzene monomer are used.

16. A process for internally sealing a leaking fibrous packing at a joint in a gas main, said process comprising the steps of saturating said fibrous packing with a liquid sealing substance capable of swelling said packing and of being cured to a substantially solid state, said liquid sealing substance being selected from the group consisting of polyglycol diepoxide, polyglycol triepoxide, and a mixture of said epoxides, and a curing agent selected from the group consisting of pyridine, picoline, piperidine, amylamine, hexylamine, heptylamine, octylamine, ethylene diamine, diethylene triamine, and triethylene tetramine, swelling said fibrous packing at said joint with said liquid epoxy resin, and curing said liquid epoxy resin with said curing agent added at a later time so that said cured sealing substance combines with said swollen packing to provide a solid, tough, non-volatlie, and permanent seal for said fibrous packed joint.

References Cited

UNITED STATES PATENTS

| 2,094,691 | 10/1937 | Williams | 138—97UX |
| 2,315,552 | 4/1943 | Skeen | 138—97X |
| 3,163,181 | 12/1964 | Xenis et al. | 138—97 |
| 3,287,148 | 11/1966 | Hilbush | 117—2 |

BENJAMIN A. BORCHELT, Primary Examiner

S. C. BENTLEY, Assistant Examiner

U.S. Cl X.R.

117—2; 156—330; 227—1; 264—36; 285—295